Figure 1:
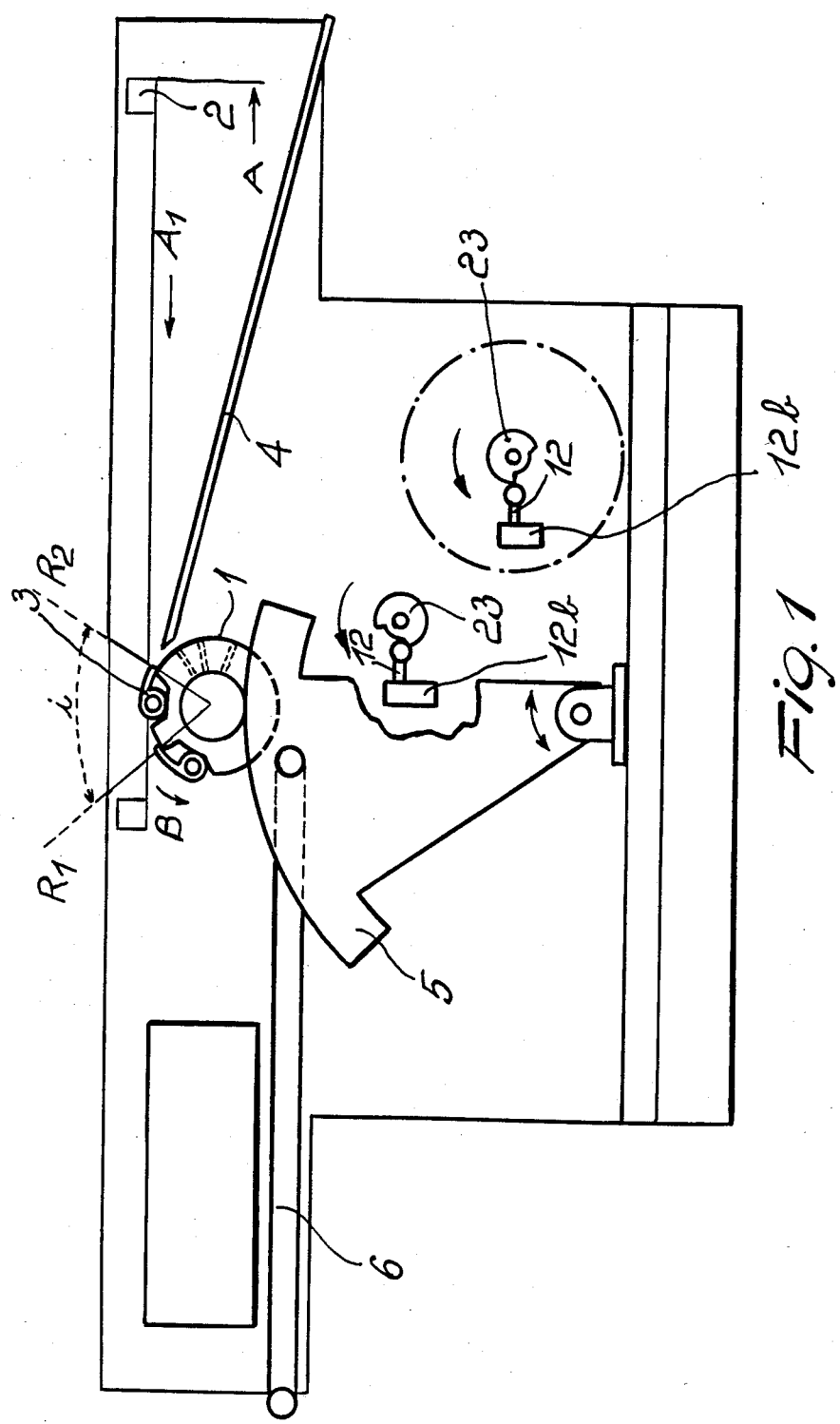

United States Patent [19]

Brasa

[11] Patent Number: 4,783,616

[45] Date of Patent: Nov. 8, 1988

[54] DEVICE FOR SLOWING DOWN THE ROTATIONAL SPEED OF THE SHEET TRANSFER AND PRINTING CYLINDER FOR SINGLE-SHEET SILK SCREEN PRINTING MACHINES

[75] Inventor: Umberto Brasa, Milan, Italy

[73] Assignee: Siasprint Group S.r.l., Italy

[21] Appl. No.: 29,623

[22] Filed: Mar. 24, 1987

[30] Foreign Application Priority Data

Mar. 27, 1986 [IT] Italy .............................. 19904 A/86

[51] Int. Cl.$^4$ .............................................. H02P 5/08
[52] U.S. Cl. ..................................... 318/329; 101/116; 364/469
[58] Field of Search ............................. 101/116, 129; 318/301–302, 329–330, 362–365, 309–310; 364/468–471

[56] References Cited

U.S. PATENT DOCUMENTS

| | | | |
|---|---|---|---|
| 3,532,953 | 10/1970 | Daab et al. | 318/362 |
| 3,934,505 | 1/1976 | Kushner | 101/116 |
| 4,366,542 | 12/1982 | Anselrode | 101/116 |

Primary Examiner—William M. Shoop, Jr.
Assistant Examiner—David S. Martin
Attorney, Agent, or Firm—Amster, Rothstein & Ebenstein

[57] ABSTRACT

A processor-controlled device for application to the control board of single-sheet fed silk-screen printing machines is described, of the type having a cylinder with sheet delivery and transfer grippers which is pivotally mounted for bidirectional alternating rotation through an oscillating d.c. motor driven circular sector to the purpose of slowing down the speed of the printing sheet transfer cylinder in the return stroke, comprising a potentiometer with two moving elements and a single driving shaft, one of said moving elements being fed at a pre-established voltage from the motor control board so as to provide the motor speed reference signal, and the other being fed at a voltage of equal value and polarity from a computer so as to obtain an output signal which is the reference signal input to the computer itself, said computer being programmed so as to convert its input signal to an output signal of a polarity which is opposite to that of the motor speed reference signal, said computer output signal being then input to the motor control board with the intermediary of a microswitch operated by a cam fixedly mounted on the cam shaft from which the oscillating circular sector is driven, so that for each value of the computer output signal having a polarity opposite to that of the reference signal for the motor speed, a motor speed reduction proportional to said computer output signal is obtained.

3 Claims, 2 Drawing Sheets

DEVICE FOR SLOWING DOWN THE ROTATIONAL SPEED OF THE SHEET TRANSFER AND PRINTING CYLINDER FOR SINGLE-SHEET SILK SCREEN PRINTING MACHINES

The present invention relates to a device with electronic data processing for application to conventional single-sheet fed silk-screen printing machines, which is intended to provide a slowing down of the rotational speed of the printing sheet feeding and support cylinder pivotally mounted for bidirectional alternating rotation under a printing head, during the return stroke.

It is well known that for silk-screen printing machines which are fed with single sheets or with cut-to-size paper or the like, a stream sheet feeding is provided toward a suction cylinder which, by means of delivery grippers arranged at its ends, will grip each sheet and drag it under a printing frame also capable of reciprocating motion.

Said cylinder is normally driven by a circular sector gear which engages the same cylinder and which is put in an oscillatory or alternating motion in order to impress equal bidirectional constant-speed rotations to the printing cylinder; more precisely, during one direction of rotation the cylinder will transfer the sheet against the printing frame until the end of the printing operation and then, after removal of the printed sheet, it will be made to turn backwards by the same sector gear, to enable the grippers which are integral with the cylinder to resume their starting position and grip the next sheet. The feed cylinder is therefore submitted to the same rotational speed both in the transport and in the return phase of the feeding device so normally resulting in some not negligible technical and practical inconveniences.

In fact, because the cylinder with its grippers has a not negligible mass, said mass after being put into rotation will obviously tend to continue its motion due to its inertia when it is stopped (for the reversal of rotation), and this results in undesirable impacts of the grippers against the sheet which is in readiness to be gripped, and possibly in a defective gripping action.

On the other side, because the transfer and printing cylinder driving motor is of the direct current type, whose speed is determined by the supply voltage, a variation of the return speed of the cylinder with respect to the speed of transport, to avoid the abovementioned inconveniences, cannot be accomplished in the silk-screen printing machines presently known.

It is therefore an object of the present invention to provide a processor-controlled device capable of being associated to conventional silk-screen printing machines, which is structured as to obviate the abovementioned inconveniences of said prior art machines and which is particularly capable of providing an automatic constant-speed reduction of the return speed of the printing cylinder, said speed reduction being programmable on the basis of the operating speeds selected with relation to the type of machine and to the printing requirements.

One other purpose of this invention is that of providing a slowing-down device which may be easily applied to the motor control boards or consoles without requiring substantial changes to said control boards.

These and other purposes, which will be better understood from the following description, are achieved by a processor-controlled device for application to the control boards of silk-screen printing machines with stream sheet feeding, of the type provided with a cylinder with sheet delivery and transfer grippers, which is pivotally mounted for bidirectional alternative rotation through an oscillating direct-current motor driven circular sector to the purpose of slowing down the speed of said cylinder in the return stroke, said device consisting, according to the present invention, in a potentiometer with two moving elements and a single driving shaft, one of said moving elements being fed at a preestablished voltage from the motor control board so as to provide the motor speed reference signal, and the other being fed at a voltage of equal value and polarity from a computer so as to obtain an output signal which is the reference signal input to the computer itself, said computer being programmed so as to convert its input signal, through an operational amplifier or the like, to an output signal of a polarity which is opposite to that of the motor speed reference signal, said computer output signal being then input to the motor control board with the intermediary of a microswitch operated by a cam fixedly mounted on the cam shaft from which the cylinder is driven through an oscillating circular sector, so that for each value of the computer output signal having a polarity opposite to that of the reference signal for the motor speed, a motor speed reduction proportional to said computer output signal is obtained.

More particularly, to the moving elements of said twin-element potentiometer are applied two equal negative voltages, referred to a common point, so as to electrically decouple these potentiometers.

Figure 2:
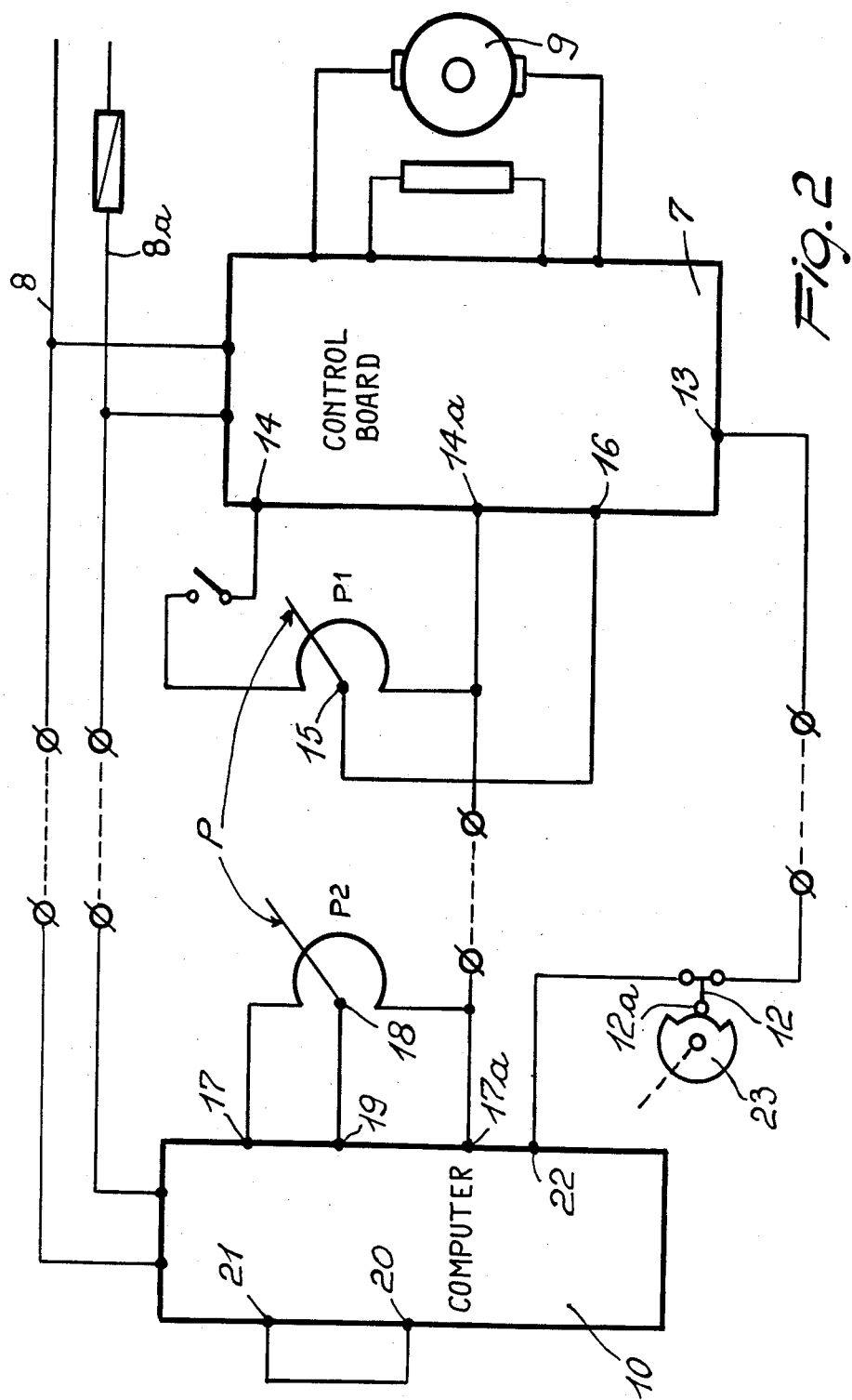

The invention, in its preferred non-limiting embodiment, will be better described in detail hereafter with reference to the accompanying drawings, given merely as an example and therefore in no limiting sense, in which:

FIG. 1 is a schematical side view showing the structure of a known silk-screen printing machine, limitedly to its transfer and printing cylinder and to its related driving sector gear, to which a speed slowing device according to the present invention can be associated, and FIG. 2 shows in detail the electronic wiring diagram of a speed slowing device according to the present invention, associated to the motor control board.

With reference to these figures a silk-screen printing machine particularly apt to be combined with the speed slowing device, which is the subject of the present invention, is basically composed of an idle horizontalshaft cylinder of the suction type, which is located under and in contact with a printing frame 2, capable of reciprocating motion in the two horizontal directions shown by arrows A—A'. To the ends of the cylinder 1 two grippers 3 are associated, which are apt to grip single sheets (not shown) fed in a well-known way over an inclined plane 4 whose upper end is located tangentially to the external surface of said cylinder.

The cylinder 1 is put in a bidimentional alternating rotational motion with pre-established strokes by a circular sector 5 to which an oscillatory motion is impressed through a cam shaft (or a linkwork) equally not shown; the bidimentional stroke of sector 5 is so designed as to rotate the cylinder 1 in the direction of arrow B by an angle sufficient to enable the sheet dragged by it to be printed on its entire surface or on pre-established parts of it, and then, after the printed sheet has been delivered to the adjoining conveyor tape 6, to reverse the direction of rotation of said cylinder and to cause it to stop with its gripper 3 (FIG. 1) in position, ready for gripping the next sheet.

As already stated, the problem which the present invention is intended to solve is that of slowing down the rotational speed of the cylinder 1 during its return stroke toward the gripping zone, said slowing down being effected according to the present invention for a certain well pre-established angle "i" of rotation; in other words, the starting $R_1$ of the slowing down has to take place before gripper 3 has reached its gripping position and the end $R_2$ of the slowing down has to coincide with the time instant of rotation reversal of the cylinder.

Said slowing down is obtained, according to the present invention, by means of a processor-controlled device whose circuit is schematically shown in FIG. 2. In this Figure the usual control board 7, which is fed from the power supply network through cables 8—8a, is shown to control via a potentiometer the direct current motor 9; this motor drives the camshaft which transmits an oscillatory motion to the circular sector 5 (FIG.1).

In place of the usual potentiometer of the control board, a twin potentiometer P is provided, whose two moving elements are identified with P1 and P2 in FIG. 2 and both of them are fitted to the same driving shaft. To the twin potentiometer P a computer with logic card 10 is associated, the output 22 of which is connected via a microswitch 12 (which will be better clarified below) to the input 13 of the control board 7.

The computer 10 is fed from the same power supply means 8, 8a.

In this circuitry, if a negative voltage derived from the outputs 14—14a of the control board is applied across the potentiometer P1, from the slider 15 of the potentiometer P1 an output is obtained which represents the reference signal 16 for the motor speed; likewise, an equal negative voltage, derived from the outputs 17—17a of the computer with logic card 10 and applied across the potentiometer P2, will generate an output signal from the slider 18 which represents the reference signal 19 for the computer 10. Thus, the two potentiometers are electrically decoupled by two negative voltages referred to a common point which is defined by the connection 14a—17a. In these conditions, the reference signals 16 and 19 are of equal value and therefore, in order to enable the computer 10 to process two signals of different amplitude (since it has been programmed accordingly), the reference signal 19 for the computer is converted by the computer itself by means of an operational amplifier, to a signal 20 which is made available at the output 21.

The output signal 21 is thus processed, according to a pre-established processing program, into a signal bound to the values of the two reference signals. This signal represents the computer output 22 and it is applied to the input 13 of the control board via the abovementioned switch 12, which consists of a switching body 12b whose rod is provided at its end with a wheel 12a constantly engaged with a cam 23 integrally mounted on the camshaft which drives said circular sector 5. The microswitch 12 is so prearranged that, when it is in the closed position (i.e. with the wheel 12a inside the slot of the cam 23), the output 22 will be applied to the input 13 of the control board 7. Because the computer 10 has been programmed to emit always positive output signals while the reference signals are always negative, a speed reduction of the motor 9 is obtained which is proportional to the output 22 of the computer.

Therefore, by changing the setting of the potentiometer P1 and therefore the speed of rotation of the motor 9, a signal 16 is obtained which is equal (and of equal polarity) to the signal 19 of the potentiometer P2, and the computer is pre-arranged so as to process and supply an output 22 which is proportional to the reference value 16 and to an amplified signal 20 which is of such a value as to effect, at each closure of the microswitch 12, a reduction of the speed of rotation of the motor.

The shape of the slot in the cam 23 is so designed as to enable the microswitch 12 to close the circuit at the time instant pre-established for the start of speed reduction (for example, beginning from point $R_1$ of FIG. 1) and open the same circuit just after the gripping of the sheet, as indicated with $R_2$, i.e. at the time instant of the reversal of rotation of the printing cylinder 1. The position of the cam 23 as illustrated in FIG. 1 shows the switch in its closed state, while in the encircled detail shown nearby, the same switch 12 is kept in its open position by the cam 23.

Obviously, in the practice of the present invention, many changes and modifications to the above described preferred embodiment of the invention can be carried out without departing from the scope thereof.

Thus, the above description has been found to be effective for silk-screen printing machines designed for a smaller sheet size.

For machines designed to handle larger sheet sizes, the masses which come into play may reach so high values as to introduce inertial forces and resulting unacceptable operation delays. It has therefore been found necessary to eliminate the cam and the microswitch and to introduce a proportional-action linear transducer, or the like, so arranged that when a lever connected to one of the two parts in relative oscillatory motion (represented respectively by the circular sector and by the machine frame) comes into the field of influence of the transducer connected to the other part, a deceleration proportional to said relative position of the lever and to the masses involved is produced, a continuous output signal 22 being applied to the control board which will operate a continually decreasing deceleration up to the end of stroke of the cylinder 1.

After the end of stroke has been reached, the lever will resume a position such as to cause the speed to be changed from minimum to a maximum speed in a time pre-set according to the inertias of the system.

I claim:

1. A device for slowing down the rotational speed, in its return stroke, of a transfer cylinder in a single-sheet fed silk-screen printing machine, said cylinder being operatively connected to a circular sector which is driven in an oscillatory motion by a motor, comprising:
   (a) a motor control board;
   (b) a twin potentiometer having two moving elements on a single driving shaft, the first one of said moving elements being electrically connected to said motor control board to provide a motor speed reference signal of a set polarity, said motor speed reference signal being variable by setting said twin potentiometer;
   (c) a microswitch;
   (d) a cam driven by said motor and operatively coupled to said microswitch;
   (e) a computer electrically connected to said motor control board, said computer having an output electrically connected to an input of said control board upon closure of said microswitch, said second moving element of said potentiometer being connected to said computer to provide said computer with a computer reference signal; and (f) means under the control of said computer for converting said computer reference signal into a signal of opposite polarity with respect to said motor reference signal, said opposite polarity signal being proportional to said motor reference signal and to said computer reference signal, said opposite polarity signal being input to said motor control board through closure of said microswitch, so that when said microswitch is closed said opposite polarity signal is added to said motor reference signal to slow down the rotation of said motor.

2. A device, according to claim 1, wherein two equal negative voltages are applied to said moving elements of said twin potentiometer to provide for electrical decoupling, said negative voltages being referred to a common point defined by a connection of an output of said control board to an output of said computer.

3. A device, according to claim 1, wherein said motor is slowed down during a selected portion of the angular return stroke of said cylinder by means of a suited profile of said cam.

* * * * *